United States Patent [19]
Palmer

[11] 3,735,259
[45] May 22, 1973

[54] OVERVOLTAGE SURGE ARRESTER FOR A METER

[75] Inventor: Ansell W. Palmer, Hampton, N.H.

[73] Assignee: General Electric Company

[22] Filed: Oct. 14, 1971

[21] Appl. No.: 189,458

[52] U.S. Cl. .................324/110, 313/325, 317/105
[51] Int. Cl. .........................G01r 1/00, H01j 17/20
[58] Field of Search ....................324/110; 313/325; 317/77, 78, 105, 108

[56] References Cited
UNITED STATES PATENTS

| | | | |
|---|---|---|---|
| 3,648,166 | 3/1972 | Redecker et al. | 324/110 |
| 1,107,584 | 8/1914 | Burke | 317/77 |
| 796,068 | 8/1905 | Duncan | 324/110 |
| 1,356,720 | 10/1920 | Jacobs | 317/77 |
| 3,501,667 | 3/1970 | Melanson | 313/325 |

Primary Examiner—Rudolph V. Rolinec
Assistant Examiner—Ernest F. Karlsen
Attorney—Francis X. Doyle and Vale P. Myles

[57] ABSTRACT

An insulating base plate for a meter, such as a watt-hour meter, is provided with an integral housing for a helically coiled electrical resistance wire that forms part of a current limiting sparkgap assembly which is enclosed completely within the meter base plate and its associated meter cover. The housing arrangement for the helical resistance wire is characterized by embodying spacing means for maintaining the individual coils of the helix separated from one another when they are subjected to magnetic forces due to the discharge of an overvoltage surge through the sparkgap assembly. A further characteristic feature of the sparkgap assembly is the provision of a novel means for accurately and inexpensively mounting the respective electrodes of the sparkgap in a predetermined relationship with respect to one another.

4 Claims, 4 Drawing Figures

Patented May 22, 1973  3,735,259

Inventor,
Ansell W. Palmer,
by Vale P. Myles
His Attorney.

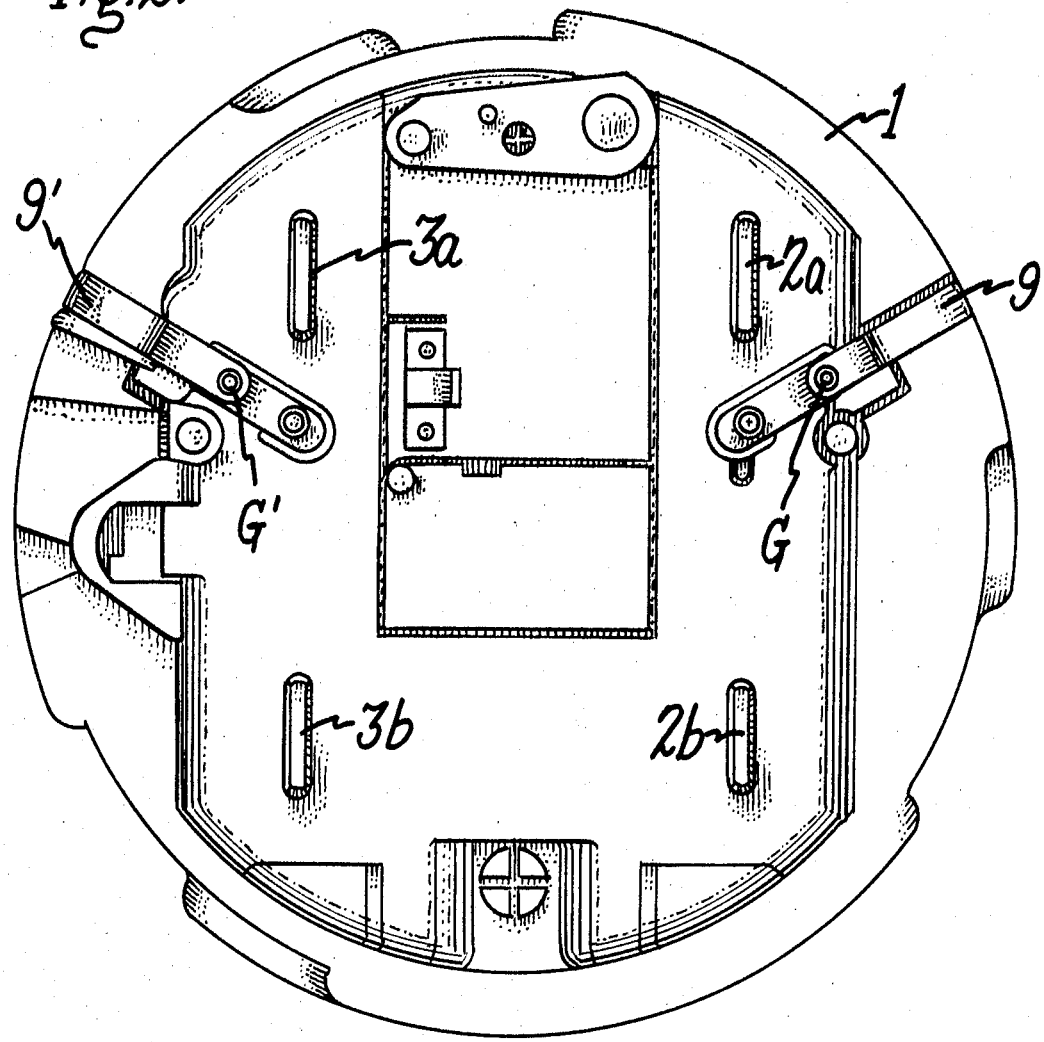

OVERVOLTAGE SURGE ARRESTER FOR A METER

BACKGROUND OF THE INVENTION

It is well known in the field of electric meters, such as watthour and demand meters, to provide overvoltage surge arresters to protect the meter circuitry from damage by excessive voltages that may be transmitted to the meter from a power distribution line. In fact, the four major manufacturers of watthour meters in the United States of America have already developed and placed into service various types of lightning arresters for use in conjunction with watthour meters. For example, U.S. Pat. No. 3,417,277 — Becker, entitled "Protective Means for Electric Meter Circuits," which issued Dec. 17, 1968 and is assigned to Sangamo Electric Company, discloses an electric meter having an arc-gap that is provided with a means for venting arc-generated gases from the meter housing. U.S. Pat. No. 2,889,494 — Schmidt et al., entitled "Meter Circuit Protective Means," which issued June 2, 1959 and is assigned to Westinghouse Electric Corporation, discloses a surge protective device for an electrical instrument such as a watthour meter. This device is characterized by having resilient and de-formable members that are adjustable to define a surge discharge gap. Both of the prior art types of surge discharge gaps disclosed in the two foregoing patents are similar insofar as they utilize a portion of a meter base plate to support the sparkgap electrodes of a discharge gap in spaced-apart relationship on an outer surface of a meter base plate, so that an arc formed between these electrodes is exposed to the exterior surface of the meter.

A somewhat different type of surge voltage protective device for meters has been employed by Duncan Electric Company. U.S. Pat. No. 3,467,877 — Dooley, which issued on Sept. 16, 1969 and is assigned to Duncan Electric Company, discloses this different type of discharge gap. This prior art discharge gap is characterized by incorporating a pair of sparkgap electrodes mounted in spaced-apart relationship within a portable insulating body, which is then mounted on, or adjacent to a meter housing. The insulating body mounting the sparkgap electrodes is formed to define a frusto-conical surface between the sparkgap electrodes so that it operates to blast arc-generated gases outward from the electrodes. Finally, it is known in the prior art to form a current limiting sparkgap assembly for an electrical meter by connecting a coiled resistance wire in the surge voltage discharge circuit of the meter. An arrangement of this type is disclosed in U.S. Pat. No. 3,501,667 — Melanson, entitled "Surge Protector for Secondary Voltage Circuits" which issued Mar. 17, 1970 and is assigned to General Electric Company. The surge voltage arrester assembly disclosed in the Melanson patent utilizes a pre-formed insulating member to mount a coiled resistance wire in fixed position with respect to a pair of sparkgap electrodes, which are also mounted on the insulating member. Additional support means are provided for rigidly mounting the insulating member and the current limiting sparkgap assembly associated with it in fixed relationship with respect to a meter base plate. The Melanson arrester is similar to those of Becker and Schmidt et al., mentioned above, in that it also positions the arrester sparkgap outside of the meter housing so an arc formed in it is exposed to the atmosphere surrounding the meter.

As indicated by the disclosures of the patents mentioned above, except for the Melanson patent, it is a common practice at the present time to use simple sparkgaps to protect meter circuitry from overvoltage surges. When such a simple sparkgap arcs over, it provides a low resistance path to ground for an overvoltage surge and the power-line current that follows the surge through the gap. On circuits that are capable of providing short circuit currents in excess of 2,000 amperes, it is necessary to provide some means of limiting such power follow current so that excessive burning of the sparkgap electrodes and surrounding insulating material does not occur. It was toward this end that the current limiting surge protector disclosed in the aforementioned Melanson patent was developed. It is also an object of the present invention to disclose an improved type of current limiting gap that is ideally suited for protecting electric meters from overvoltage surges.

A desirable feature of a surge protector for use with electric meters is that it should be inexpensive to produce and reliable in operation under a wide variety of ambient conditions. The surge protector disclosed herein meets these objectives.

An additional object of the present invention is to provide an overvoltage surge protector for an electric meter in which the surge protector comprises a sparkgap assembly having component parts that are integrally molded in an insulating base plate of the meter.

Another object of the invention is to provide a surge voltage protector for an enclosed electric meter in which a protective surge gap is mounted entirely within the meter enclosure so that it is protected from exposure to the atmosphere by the meter housing, and so that any arc formed in the gap is confined within the meter housing.

Yet another object of the invention is to provide a current limiting overvoltage surge arrester that is inexpensive to manufacture and maintain, and at the same time affords an easily set sparkover voltage.

Still another object of the invention is to provide an electric meter with a surge voltage arrester having means for quickly and accurately positioning the sparkgap electrodes thereof to a predetermined spacing.

Additional objects and advantages of the invention will become apparent to those skilled in the art from the description of it that follows, taken in conjunction with the accompanying drawings.

SUMMARY OF THE INVENTION

In one preferred embodiment of the invention an insulating base plate of a meter is provided with integral wall means that defines a housing area for a helically shaped resistance wire. The helical resistance wire is mounted in the housing area, so that its respective coils are maintained in spaced-apart relationship when they are subjected to an overvoltage surge that heats and softens the wire while at the same time exerting magnetic forces that tend to move the coils into contact with one another. The respective opposite ends of the resistance wire are electrically connected to a pair of terminals that are insulated from one another. One of these terminals is adapted to be electrically grounded and the other terminal comprises a first arcing electrode. In one form of the invention, a novel, resiliently deformable washer member is mounted in spaced-apart relationship above the first arcing electrode to define a second arcing electrode of a surge voltage discharge sparkgap. This washer member is electrically connected to one of the electrical input terminals supplying power to the meter.

BRIEF DESCRIPTION OF THE DRAWINGS

FIG. 2 is a top plan view of the reverse side of the meter base plate illustrated in FIG. 1, depicting the outer ends of both of the grounding terminals illustrated in FIG. 1, with these outer ends respectively connected to a pair of conventional grounding straps.

DESCRIPTION OF A PREFERRED EMBODIMENT

Figure 1:
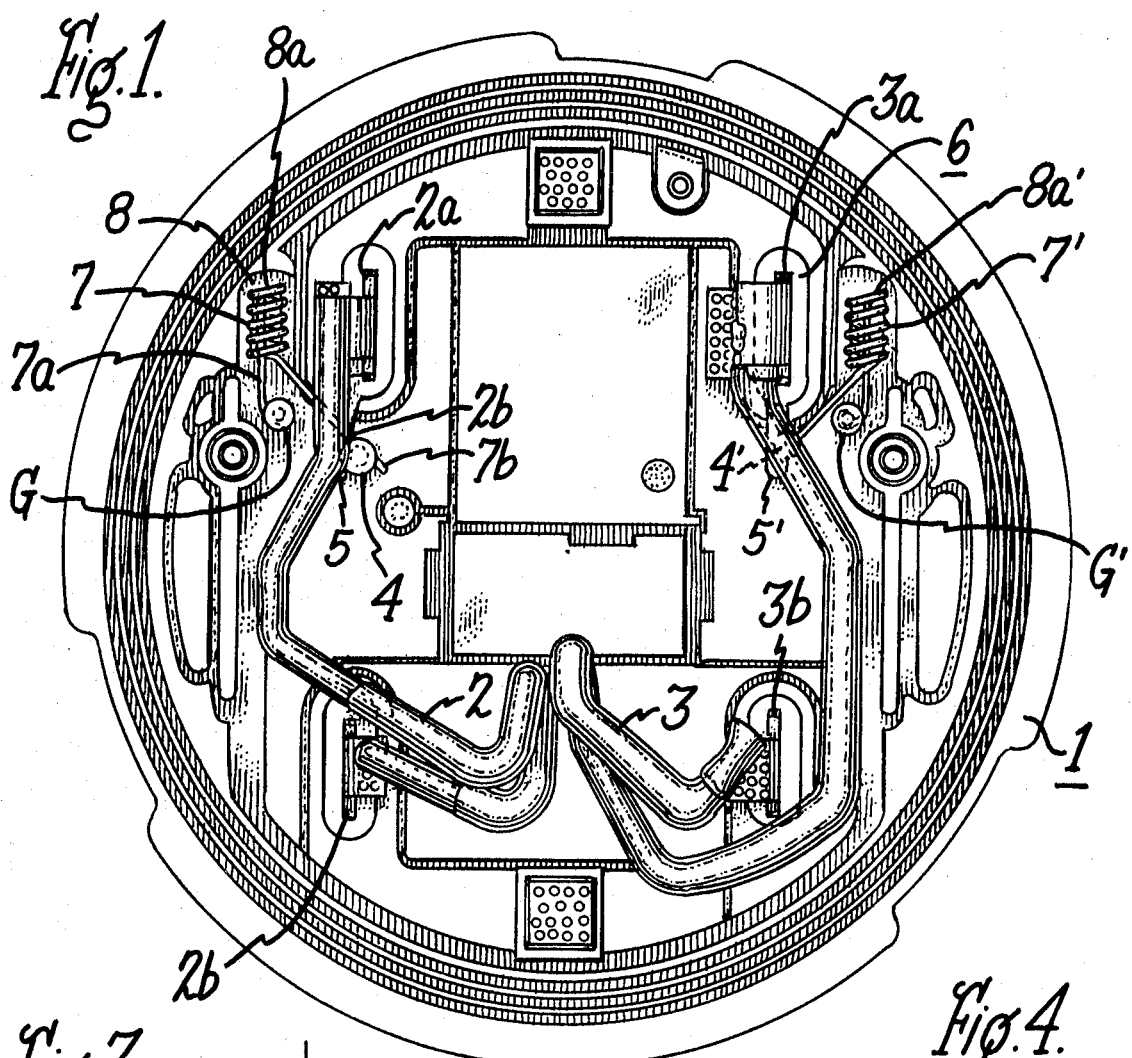
FIG. 1 is a top plan view of a meter base plate having a pair of surge voltage arresting sparkgaps mounted on it and housing a pair of helically coiled resistance wires, which are respectively electrically connected between one electrode of each sparkgap and suitable grounding terminals, pursuant to the teaching of the present invention.

Referring now to FIG. 1 of the drawing, there is shown a molded insulating base plate 1 for an electric meter, such as a conventional watthour meter. As is well known in the art, such base plates are commonly made of an insulating plastic material that is readily moldable into precisely controllable configurations. A pair of current coils 2 and 3 are mechanically and electrically connected between respective pairs of blade-shaped terminals 2a, 2b and 3a and 3b. These blade-type terminals are held in position with respect to the base plate 1 in any conventional manner, and they extend through base plate 1 to protrude through the outer surface thereof, as is best shown in FIG. 2 of the drawing. It should be understood that the current coils 2 and 3 may be any conventional form suitable for use as current coils of a watthour meter and they may be formed of any suitable electrical conducting metal, such as copper or aluminum. Of course, if the teachings of the invention are practiced on meters other than watthour meters, other electrical conducting means may be used in lieu of coils 2 and 3, as will be apparent to those skilled in the art. The blade terminals 2a, 2b, 3a and 3b are preferably formed of copper but other electrically conductive materials may be used.

In order to mount the meter base plate 1 in operating position, it is common practice to insert the four blade terminals into matching sockets (not shown) which are, in turn, electrically connected to a source of electrical power, such as an energized power distribution system. In order to protect the meter (not shown) that is adapted to be mounted on base plate 1 from damage due to overvoltage surges being transmitted to it from such a power system, a pair of sparkgap assemblies are provided, pursuant to the present invention. One of these sparkgap assemblies comprises a first arcing electrode 4 which is rigidly mounted on the base plate 1 by being riveted to it. The arcing electrode 4 may be formed of steel or other arc-erosion-resistant, electrically conductive metal. A second arcing electrode is supported on the base plate 1 in spaced-apart relationship to the first electrode 4. Two forms of such a second electrode are illustrated in FIG. 1 of the drawing, respectively, in the two sparkgaps shown there. In one form, mounted directly above the first arcing electrode 4, an uninsulated section 2b of current coil 2 comprises the second arcing electrode 5. In the second form of the invention, which is illustrated in the sparkgap mounted adjacent current coil 3, the second arcing electrode, designated as 5', comprises one section of an elongated washer member 6. The member 6 includes a slotted portion 6a, which is formed to receive the blade terminal 3a through it, as well as the elongated arcing electrode 5' that is adapted to be positioned in spaced-apart relationship to a first arcing electrode 4', which is similar in configuration to the arcing electrode 4 of the sparkgap assembly associated with coil 2.

In order to describe the current limiting feature of the sparkgap assemblies of the present invention, reference will first be made to the arcing electrodes 4 and 5, which are associated with current coil 2. Pursuant to the present invention, an elongated electrical resistance wire 7 of a predetermined configuration is electrically connected between the first arcing electrode 4 and a ground terminal G. In the preferred form disclosed herein, the electrical resistance wire 7 defines a helix, as shown, intermediate its two ends. As can be seen in FIG. 1, wall means 8, that are an integral portion of the base plate 1, are molded to define a housing area 8a in the base plate 1 which is adapted to receive at least a portion of the resistance wire 7 therein.

Specifically, the housing area 8a includes a plurality of spaced-apart ridges 8b–f (see FIG. 3) which are effective to engage parts of the resistance wire 7 to hold the separate coils of the wire 7 in a relatively fixed position with respect to the base plate 1. This mounting function of the housing area 8a is particularly important with the novel form of the invention disclosed herein. It will be noted that one end 7a of the wire 7 extends through the central part of the helix that is formed intermediate its two ends while the other end 7b of the wire 7 is positioned in a groove cut in the base plate 1, under the first arcing electrode 4. Of course, the first end 7a of wire 7 must be kept separated from the coils of the helix by a suitable insulating medium, such as air. This spacing would be difficult to insure if the helical portion of wire 7 was free to move when it is softened by the heating resulting from a large discharge current being passed through it at the same time that strong magnetic forces are induced in the coils of wire 7 by such a current. However, it has been found that with the novel positioning means of the housing area 8a not only are the respective ends 7a and 7b of wire 7 maintained in spaced-apart relationship, the respective coils of the helical portion of wire 7 are prevented from contacting one another and being shorted during an overvoltage surge discharge operation.

A further important advantage of the present invention is that the novel coil housing area 8a acts as a heat sink to help cool the resistance wire 7 during and following a surge current discharge. It should be understood that the ridges 8b–f are in contact with approximately half of the length of each coil of wire 7, so good heat exchange can take place between the coil and base plate 1.

In order to complete a circuit to ground, the ground terminal G is staked through the base plate 1, as best seen in FIG. 2, and is mounted in electrical engagement with a conventional grounding strap 9 that is adapted to be firmly connected to a suitably grounded electrical conductor during normal operating use of the meter that is mounted on the base plate 1.

Figures 3, 4:
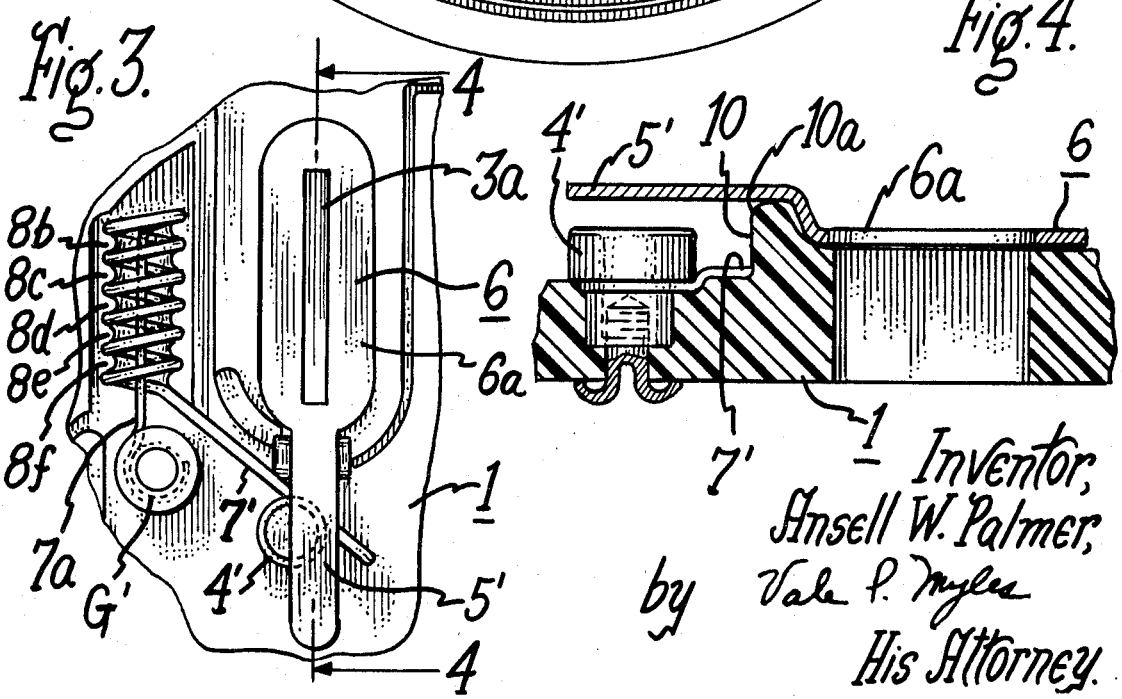
FIG. 3 is a fragmentary top plan view of one of the sparkgap assemblies illustrated in FIG. 1 of the drawing, showing in enlarged detail some of the characteristic features of the current limiting sparkgap assembly of the present invention.
FIG. 4 is a side elevation view, in cross section, taken along the plane 4—4 in FIG. 3, illustrating some unique features of the arcing electrodes, and electrode spacing means, of the present invention.

Now, the second sparkgap assembly, embodying the second arcing electrode 5', which was referred to above, will be described in greater detail by referring to FIGS. 3 and 4 of the drawing. The identifying numerals used in FIGS. 3 and 4 are similar to those used in FIG. 1 to identify like component parts of the invention. Thus, there is shown in FIG. 3 the blade terminal 3a having washer member 6 mounted around it so that the elongated second arcing electrode 5' is positioned in spaced-apart relationship above the first arcing electrode 4'. This spaced-apart relationship is perhaps best seen in FIG. 4 of the drawing.

An important feature of the present invention, which is clearly illustrated in FIG. 4, is the provision of an integral abutment 10 that is molded on the base plate 1. The abutment 10 has an upper surface 10a that is positioned a predetermined distance above the first arcing electrode 4'. As shown in FIG. 4, the upper surface 10a of abutment 10 is in engagement with the elongated second arcing electrode 5' so that it is effective to space the second arcing electrode 5' a predetermined distance from the first arcing electrode 4', thereby defining a sparkgap the length of which is a function of the position of the surface 10a with respect to the upper surface of the arcing electrode 4'. Since the first arcing electrode 4' can be easily manufactured to accurate tolerances, and fixed within a definite range of tolerances during its assembly, by simply being riveted to the plate member 1, as shown in FIG. 4, it will be apparent that the sparkgap defined by arcing electrodes 4' and 5' can be quickly and accurately set simply by tightly holding the washer member 6 in its assembled position in engagement with the surface 10a of abutment 10.

However, a further important feature of this invention is that the washer member 6 is formed of manually bendable, electrically conductive metal so that it can be readily adjusted after it is mounted in assembled position by moving it vertically with respect to the first arcing electrode 4'. Thus, the length of the sparkgap between arcing electrodes 4' and 5' can be quickly adjusted by simply inserting a screwdriver between the current coil 3 and the elongated second arcing electrode 5' so that it can be bent downward to shorten the sparkgap; or conversely a screwdriver can be positioned between the base plate 1, or the first arcing electrode 4', and the second arcing electrode 5' to lengthen the sparkgap by bending the second arcing electrode upward.

In order to limit the power follow current discharged through sparkgap 4'-5', a coiled resistance wire 7' is connected in series between first arcing electrode 4' and grounding terminal G'. It should be understood that coil 7' is identical to coil 7, and is similarly connected and mounted in a housing area 8a', which holds the coils in spaced-apart relationship, as described above. Also, the grounding terminal G' is staked through base plate 1 and is electrically connected to a grounding strap 9' (FIG. 2).

From the foregoing description of the invention, it will be apparent that various alternative embodiments and modifications may be made in it without departing from the true spirit and scope of the invention. However, I have found that when the invention is used to form a sparkgap assembly for protecting an electric watthour meter of the type commonly used to measure the consumption of electric power on secondary power distribution systems having an RMS voltage of about 120 volts, the electrical impedance of resistance wire 7 (or resistance wire 7') should be approximately 0.5 ohm, in order to limit power follow currents to non-destructive levels. Moreover, it is important that the inductance of the helical portions of these resistance wires 7 and 7' does not produce a large inductive reactance when a high frequency overvoltage surge is discharged through them, because such a reactance would result in an inductive "kick" overvoltage being applied to the protected system. More specifically, I have found that the inductive reactance of resistance wire 7, or 7', should be less than 1 ohm when discharging an overvoltage surge having a wave front with a rise time of approximately 1.5 microseconds, when the sparkgap assembly of the invention is utilized to protect the circuitry of a conventional watthour meter.

It is believed that the operation of the invention will be apparent to those skilled in the art from the foregoing description of it. However, in order to assure a complete understanding of the invention, a brief description of the operation will now be given. When the base plate 1 is mounted in operating position with the terminals 2a, 2b and 3a, 3b plugged into the energized sockets of a power distribution system, the air gaps formed between arcing electrodes 4, 5 and 4', 5' serve to isolate the respective ground terminals G and G' (See FIG. 1) and their associated resistance wires 7 and 7' (See FIG. 1) from the energized current coils 2 and 3. When a surge voltage is applied to any one of the terminals, it will cause the sparkgap associated with that terminal, i.e., either sparkgap 4-5 or sparkgap 4'-5', to arc over. Assuming sparkgap 4-5 is arced over, the surge voltage will be discharged through resistance wire 7 to terminal G, thence to ground through grounding strap 9. After the overvoltage surge has been discharged, power follow current from the energized system will tend to flow across the sparkgap 4-5 to the ground strap 9. Since this power follow current must flow through the resistance wire 7, which, as noted above, may have an impedance of approximately 0.5 ohms; assuming the surge arrester is connected to a conventional secondary distribution system that has an RMS voltage of about 120 volts, the power follow current will not be excessive. If, as just assumed, the power distribution system operates at a normal line voltage of around 120 volts RMS, it will have a peak voltage of about 170 volts; accordingly, the peak power follow current will be approximately 340 amps (I= 170/0.5), which is a safe level. Accordingly, the energy dissipated across the arc gap 4-5 is maintained at a low enough level to prevent dangerous burning or overheating of the arcing terminals 4 and 5, or the associated insulation of base plate 1. Therefore, it is easy for the arc to be extinguished when the supply voltage drops to zero during its normal 60 hertz cycle.

As noted at the outset, the desirable operating and clearing characteristics of the sparkgap assembly of the present invention are further stabilized by mounting the arcing electrodes 4 and 5 and 4' and 5' completely within the enclosure defined by the base plate 1 and a meter enclosure (not shown), since water and other contaminants are thus prevented from contacting the arcing electrodes to alter their sparkover and arc-clearing characteristics. Moreover, this arrangement serves to safely contain any arc formed in the discharge sparkgaps within the meter enclosure.

Although two separate embodiments of a second arcing electrode (5 and 5') have been illustrated herein, it will be appreciated that normally only one such embodiment will be employed to protect the circuits of a given meter, in the interests of manufacturing standardization.

What I claim as new and desire to secure by Letters Patent of the United States is:

1. An overvoltage surge arrester for a meter having an insulating base plate, comprising, a first arcing electrode rigidly mounted on said base plate, a second arcing electrode supported on said base plate in spaced-apart relationship to said first arcing electrode thereby to define a sparkgap between said electrodes, an electrical ground terminal mounted on said base plate and insulated by it from the first and second arcing electrodes, an elongated electrical resistance wire formed to define a helix intermediate the ends thereof, one end of said wire being arranged to extend through the central part of said helix and being separated from the coil thereof by an insulating medium, said resistance wire being electrically connected between said first arcing electrode and said ground terminal, wall means defining a housing area in said base plate for receiving at least a portion of said resistance wire, said housing area being effective to engage at least a section of each of the coils of said wire, thereby to hold said coils in a relatively fixed position with respect to said base plate, whereby said resistance wire is operable to limit current discharged to said ground terminal from the second arcing electrode when an arc occurs between said arcing electrodes.

2. An overvoltage surge arrester for a meter having an insulating base plate, comprising, a first arcing electrode rigidly mounted on said base plate, a second arcing electrode supported on said base plate in spaced-apart relationship to said first arcing electrode thereby to define a sparkgap between said electrodes, an electrical ground terminal mounted on said base plate and insulated by it from the first and second arcing electrodes, an elongated electrical resistance wire of predetermined configuration, said resistance wire being electrically connected between said first arcing electrode and said ground terminal, wall means defining a housing area in said base plate for receiving at least a portion of said resistance wire, said housing area being effective to engage parts of said wire, thereby to hold said parts in a relatively fixed position with respect to said base plate, whereby said resistance wire is operable to limit current discharged to said ground terminal from the second arcing electrode when an arc occurs between said arcing electrodes, said second arcing electrode (5') being formed to comprise an elongated washer member (6) that includes a slotted portion (6a) adapted to receive a blade input terminal through it, and also includes an elongated arcing electrode portion (5') that is adapted to be positioned in spaced-apart relationship to said first arcing electrode.

3. An invention as defined in claim 2 including an integral abutment on said plate, said abutment having a surface thereon positioned a predetermined distance above the first arcing electrode, said surface on the abutment being in engagement with the elongated second arcing electrode thereby to space it said predetermined distance from the first arcing electrode to define a sparkgap the length of which is a function of the position of said surface on the abutment with respect to said first electrode.

4. An invention as defined in claim 2 wherein said elongated washer member is formed of electrically conductive metal, said elongated second arcing electrode being manually bendable thereby to afford means for readily adjusting the length of said sparkgap by bending the elongated electrode to move it in relation to said first arcing electrode.

* * * * *